United States Patent
Ichiki et al.

(10) Patent No.: US 10,844,640 B2
(45) Date of Patent: Nov. 24, 2020

(54) VEHICLE FUEL SUPPLY PART STRUCTURE

(71) Applicant: TOYOTA JIDOSHA KABUSHIKI KAISHA, Toyota (JP)

(72) Inventors: Yosuke Ichiki, Miyoshi (JP); Shiroh Chiba, Aichi-gun (JP); Yukihide Kato, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 16/203,049

(22) Filed: Nov. 28, 2018

(65) Prior Publication Data

US 2019/0169891 A1 Jun. 6, 2019

(30) Foreign Application Priority Data

Dec. 4, 2017 (JP) ................. 2017-232559

(51) Int. Cl.
| | |
|---|---|
| *E05B 83/34* | (2014.01) |
| *B60K 15/05* | (2006.01) |
| *E05B 81/66* | (2014.01) |
| *E05B 77/34* | (2014.01) |
| *E05B 81/72* | (2014.01) |

(52) U.S. Cl.
CPC ........... *E05B 83/34* (2013.01); *B60K 15/05* (2013.01); *E05B 77/34* (2013.01); *E05B 81/66* (2013.01); *B60K 2015/053* (2013.01); *B60K 2015/0576* (2013.01); *B60K 2015/0584* (2013.01); *E05B 81/72* (2013.01)

(58) Field of Classification Search
CPC .......... E05B 83/34; E05B 77/34; E05B 81/66; E05B 81/72; B60K 15/05; B60K 2015/0584; B60K 2015/053; B60K 2015/0576
USPC ........................................... 296/97.22
See application file for complete search history.

(56) References Cited

U.S. PATENT DOCUMENTS

| | | | | |
|---|---|---|---|---|
| 6,189,959 | B1* | 2/2001 | VanAssche | B60K 15/05 16/86 B |
| 7,185,938 | B2* | 3/2007 | Beck | B60K 15/04 292/207 |
| 7,380,861 | B2* | 6/2008 | Engel | B60K 15/05 296/97.22 |
| 8,616,609 | B2* | 12/2013 | Ogata | B60K 15/05 296/97.22 |
| 9,656,544 | B2* | 5/2017 | Frommann | B60K 15/05 |

(Continued)

FOREIGN PATENT DOCUMENTS

JP 2016-022786 A 2/2016

*Primary Examiner* — Pinel E Romain
(74) *Attorney, Agent, or Firm* — Oliff PLC

(57) ABSTRACT

Formation of a pool of liquid around a locking pin is inhibited when a protector is provided around the locking pin. The protector is provided with projecting side surfaces that are connected to the upper surface and the lower surface and are provided above and below the locking pin. The projecting side surfaces project to the inside of the recess to an extent greater than the maximum protrusion length of the locking pin at which the locking pin protrudes to the inside of the recess to the maximum extent. The lower surface of the protector is sloped downward toward the inside of the recess from the rear side wall on which the locking pin is provided.

1 Claim, 3 Drawing Sheets

(56) References Cited

U.S. PATENT DOCUMENTS

| | | | |
|---|---|---|---|
| 10,384,534 B2* | 8/2019 | Guardianelli | ........... E05B 83/34 |
| 2019/0291571 A1* | 9/2019 | Guo | ........................ E05B 83/34 |

* cited by examiner

VEHICLE FUEL SUPPLY PART STRUCTURE

CROSS REFERENCE TO RELATED APPLICATION

The disclosure of Japanese Patent Application No. 2017-232559 filed on Dec. 4, 2017 including the specification, claims, drawings, and abstract is incorporated herein by reference in its entirety.

TECHNICAL FIELD

The present disclosure relates to a vehicle fuel supply part structure, and particularly to a locking structure of a fuel filler opening.

BACKGROUND

A vehicle rear side surface, such as a rear quarter panel, is provided with a fuel supply part. As illustrated in FIG. 3, a fuel supply part 100 has a fuel filler opening 102 and a fuel lid 104.

The fuel filler opening 102 is a terminal opening of a fuel inlet pipe and is located in a recess 106 in which a portion of the rear quarter panel is recessed inside in the vehicle width direction.

The fuel lid 104 is a lid member for covering the recess 106. The fuel lid 104 can be opened and closed by a hinge mechanism 108, for example. The inner surface of the fuel lid 104 that faces the fuel filler opening 102 has a pawl 110 protruding to the fuel filler opening 102 side. Meanwhile, a locking pin 112 protrudes from the side wall of the recess 106. Fitting of the locking pin 112 into an opening 114 of the pawl 110 prevents the fuel lid 104 from being opened and maintains the fuel lid 104 in the closed state.

The locking pin 112 can advance and retreat along its longitudinal direction. For example, a biasing member, such as a spring (not shown), biases the tip of the locking pin 112 to expose it into the recess 106. When the fuel lid 104 is returned from the open position to the closed position, the pawl 110 temporarily compresses, against the biasing member, the tip of the locking pin 112 to the side wall 116 side of the recess 106. Further, when the locking pin 112 matches the opening 114 of the pawl 110, the locking pin 112 enters the opening 114 to be engaged therewith. At this time, the tip of the locking pin 112 comes into contact with a stopper 118 provided inside the opening 114 and is maintained in a slightly compressed state.

In addition to engaging with the fuel lid 104, the locking pin 112 has various functions. For example, in JP 2016-22786 A, opening and closing signals for the fuel filler opening are generated based on advance and retreat of the locking pin 112. For example, in an extended state where no obstacle is in the direction of travel of the locking pin 112 and the locking pin 112 protrudes to the inside of the recess 106 to the full extent, an opening signal is generated. In addition, in a retracted state where the locking pin 112 is compressed, such as, for example, when the tip of the locking pin 112 comes into contact with the stopper 118 of the fuel lid 104, a closing signal is generated. The generated opening and closing signals are transmitted to an ECU which is a controller of the vehicle. While the ECU receives the opening signals, the ECU performs starting inhibition control for inhibiting starting of an internal combustion engine.

The ECU may also control opening and closing of a blocking valve (not shown) provided on the fuel inlet pipe according to opening and closing signals of the locking pin 112. For example, when the ECU receives an opening signal, it controls the blocking valve to an open valve state. In addition, when the ECU receives a closing signal, it controls the blocking valve to a closed valve state.

SUMMARY

Technical Problem

Even when the fuel lid 104 is in the open state before fuel supply, there is a possibility that the locking pin 112 is compressed during fuel supply, and a closing signal is output. As illustrated in FIG. 3, there is provided, on the base of a nozzle pipe 122 of a fuel supply gun 120 (on a nozzle cover 124 side), a splash guard 126 which is a flange member for preventing fuel oil from splashing. When the nozzle pipe 122 is inserted into the fuel filler opening 102, the splash guard 126 may contact the locking pin 112 and compress the locking pin 112. At this time, a closing signal is output, and starting of the internal combustion engine may be permitted, or the blocking valve of the fuel inlet pipe may be closed to make fuel supply impossible.

In order to prevent the splash guard 126 from contacting the locking pin 112, it may be possible to provide a protector for covering the circumference of the locking pin 112. However, depending on the shape of the protector, there is a possibility that a pool of liquid, such as a paddle, is formed around the locking pin 112. If the water is pooled around the locking pin 112, the liquid around the locking pin 112 may freeze while the locking pin 112 is engaged with pawl 110, and the fuel lid 104 may become unable to be opened.

Solution to Problem

The present disclosure relates to a vehicle fuel supply part structure. The structure has a fuel filler opening, a fuel lid, a locking pin, and a protector. The fuel filler opening is provided in a recess that is formed in a side panel of the vehicle and is recessed to the inside in the vehicle width direction. The fuel lid can be operated to the closed state in which the fuel lid covers the recess and the open state. The fuel lid is hinged to the recess and has a pawl formed to protrude from the inner surface facing the fuel filler opening. The locking pin protrudes from the side wall of the recess to the inside of that recess and can advance and retreat such that its tip moves away from and toward the side wall. The locking pin can be engaged with the pawl, and during engagement, the tip is in a retracted state in which the tip is compressed to the side wall side. The protector is provided around the locking pin. Further, the protector is provided with an upper surface and a lower surface that are separated with respect to the locking pin in the up-and-down direction and face each other, and side surfaces that are connected to the upper surface and the lower surface and are provided above and below the locking pin. The side surfaces project to the inside of the recess to an extent greater than the maximum protrusion length of the locking pin at which the locking pin protrudes to the inside of the recess to the maximum extent. The lower surface of the protector is sloped downward from the side wall, on which the locking pin is provided, toward the inside of the recess.

Advantageous Effects of the Invention

According to the present disclosure, when the protector is provided around the locking pin, the protector lower surface below the locking pin is sloped toward the inside of the recess. As a result, a liquid, such as water, on the lower surface runs along this slope and is discharged to the outside of the protector. Therefore, it becomes possible to inhibit accumulation of liquid around the locking pin.

BRIEF DESCRIPTION OF DRAWINGS

Embodiments of the present disclosure will be described by reference to the following figures, wherein.

DESCRIPTION OF EMBODIMENTS

Figure 1:
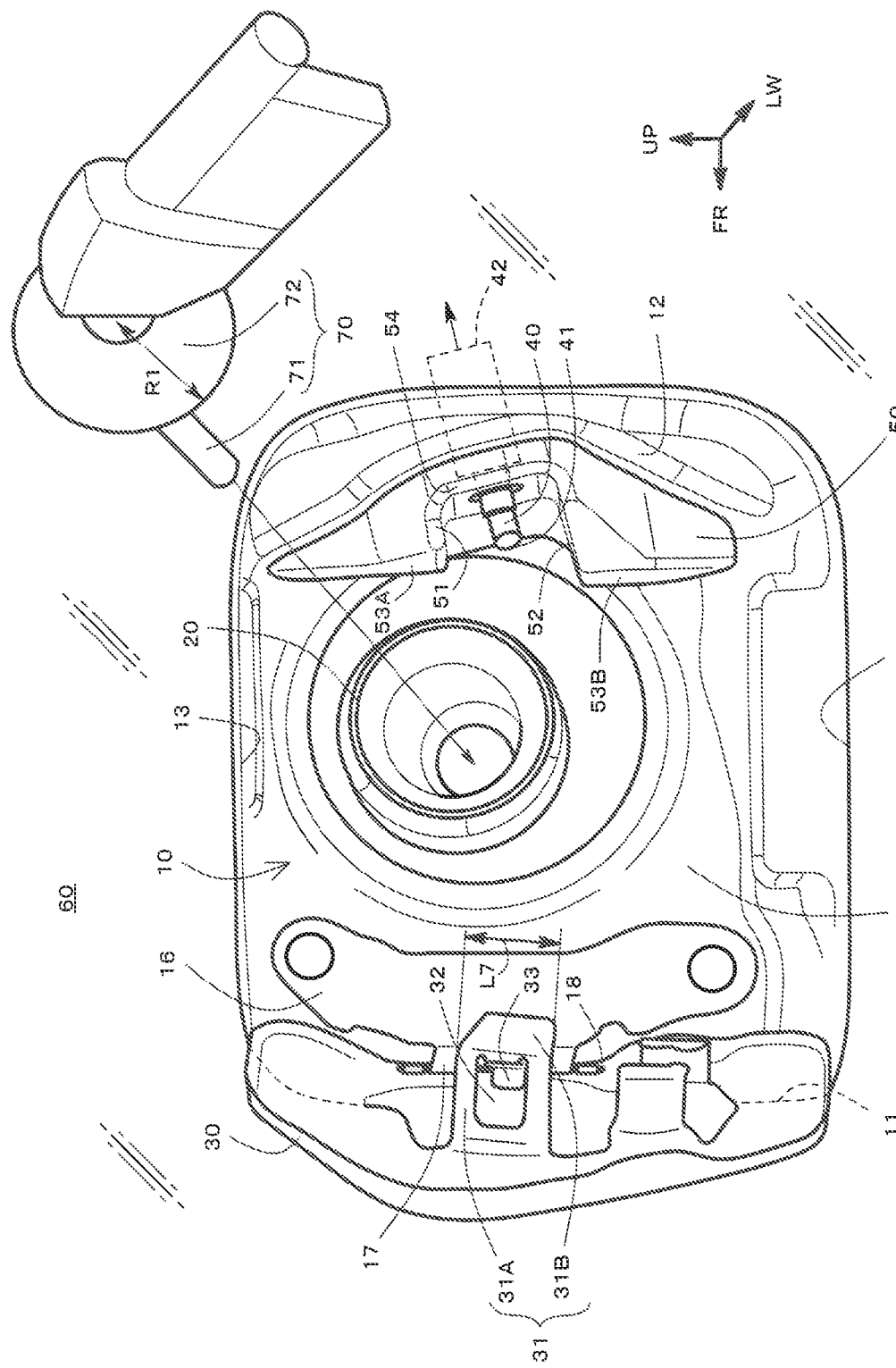
FIG. 1 is a perspective view illustrating a structure of a fuel supply part of a vehicle according to the present embodiment.
Figure 2:
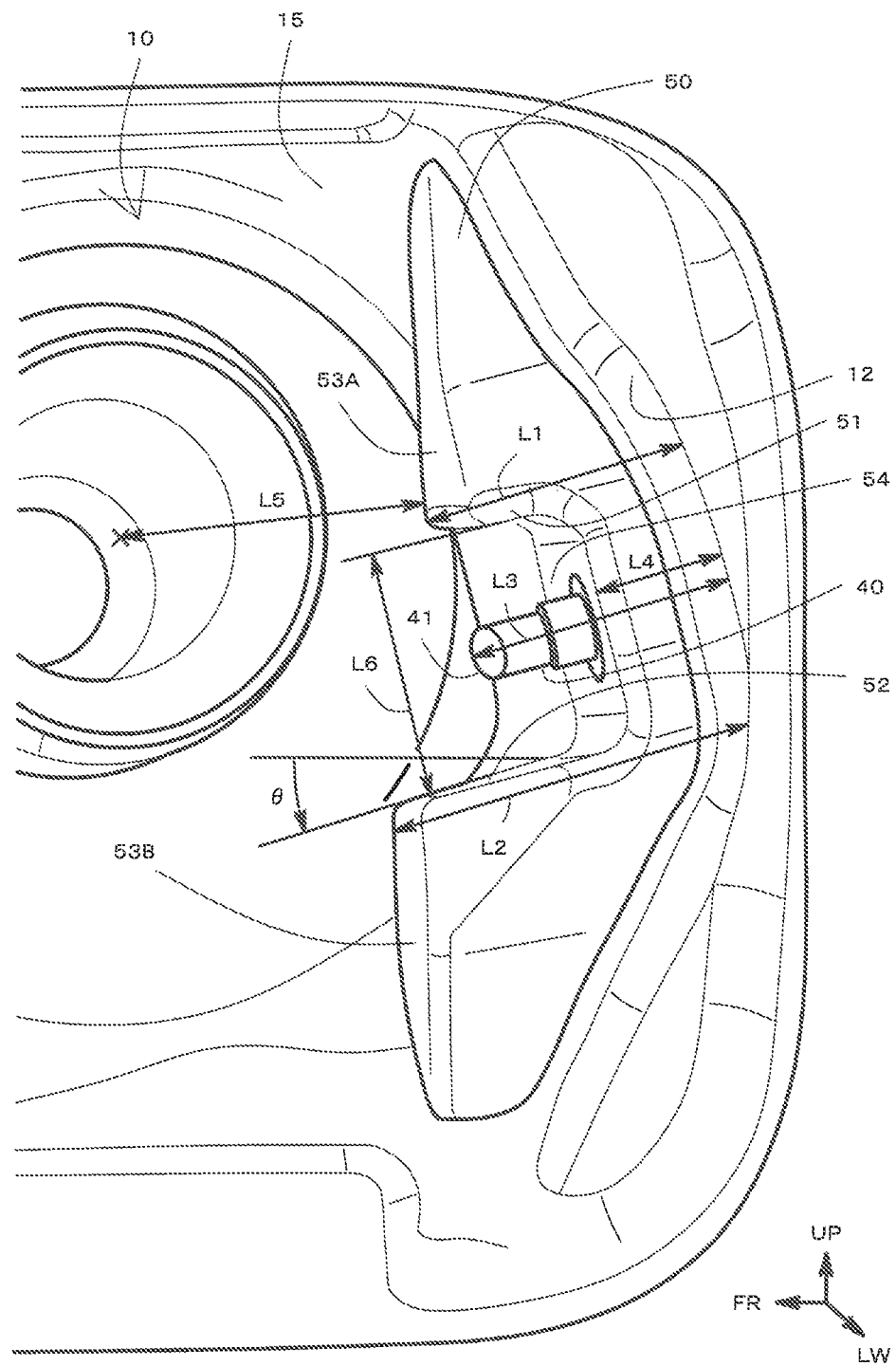
FIG. 2 is a perspective view illustrating the structure of the fuel supply part of the vehicle, particularly the shape of a protector, according to the present embodiment.
Figure 3:
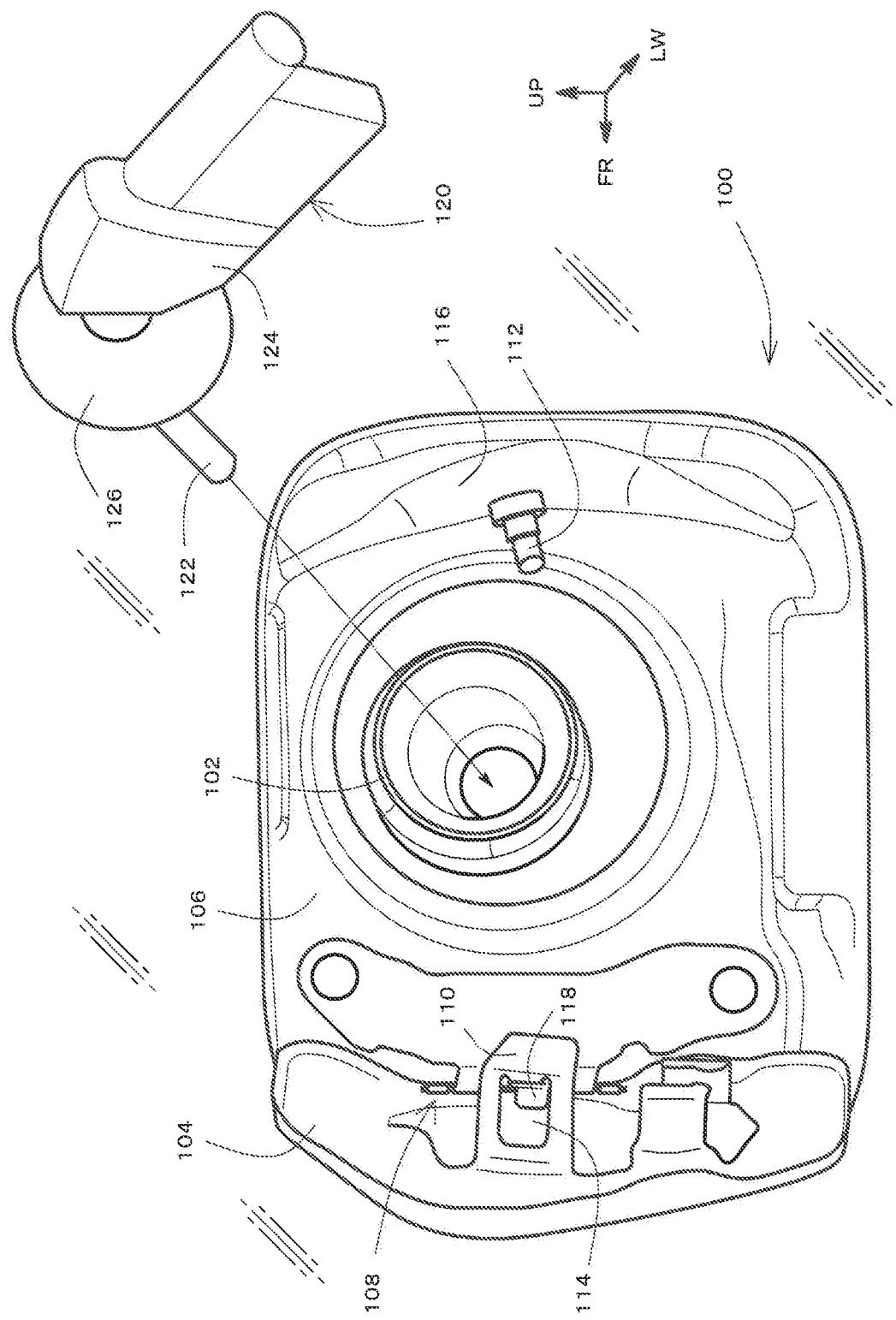
FIG. 3 is a perspective view illustrating a structure of a fuel supply part of a vehicle according to conventional techniques.

The structure of a fuel supply part of a vehicle according to the present embodiment will be described with reference to FIG. 1 and FIG. 2. In FIG. 1 and FIG. 2, the vehicle front-and-rear direction is represented by the axis indicated by the sign FR, and the vehicle width direction (hereinafter simply referred to as "width direction," if necessary) is represented by the axis indicated by the sign LW. The vertical direction is represented by the axis indicated by the sign UP. The sign FR is an abbreviation of "front," and regarding the front-and-rear direction axis FR, the vehicle front direction is assumed to be the positive direction. The sign LW is an abbreviation of "left width," and regarding the width direction axis LW, the left width direction is assumed to be the positive direction. In addition, regarding the height axis UP, the up direction is assumed to be the positive direction.

As shown in FIG. 1, these FR axis, LW axis, and UP axis are orthogonal to one another. Hereinafter, the structure of the fuel supply part of the vehicle according to the present embodiment will be described using these three axes as a reference, if necessary. For example, a "front end" means an end portion of any member which is on the positive direction side of the FR axis, and a "rear end" means an end portion of any member which is on the negative direction side of the FR axis. The "width inner side" means the inside in the vehicle width direction along the LW axis, and the "width outer side" means the outside in the vehicle width direction along the LW axis. Further, the "upper side" means the positive direction side of the UP axis, and the "lower side" means the negative direction side of the UP axis.

FIG. 1 illustrates a perspective view of a vehicle fuel supply part structure according to the present embodiment. This fuel supply part structure is provided on a side panel 60 of the vehicle. The vehicle fuel supply part structure according to the present embodiment is provided, for example, on a rear quarter panel sandwiched between a rear door and a rear hood.

The vehicle fuel supply part structure has a recess 10, a fuel filler opening 20, a fuel lid 30, a locking pin 40, and a protector 50. The recess 10 is formed by recessing a portion of the side panel 60 to the inside in the vehicle width direction by press-forming, for example. The recess 10 is a rectangular cavity when viewed from side and has a front side wall 11 and a rear side wall 12 which faces this front side wall 11. The recess 10 further has an upper wall 13 and a lower wall 14 facing each other in the up-and-down direction. In addition, the recess 10 has a bottom wall 15 that is surrounded by the front side wall 11, the rear side wall 12, the upper wall 13, and the lower wall 14.

The bottom wall 15 has an opening in the center portion thereof, and the fuel filler opening 20 is exposed from that opening. For the convenience of description, an illustration of a fuel filler cap for covering the fuel filler opening 20 is omitted from FIG. 1 and FIG. 2. The fuel filler opening 20 is an end opening of a fuel inlet pipe, and fuel is supplied from this fuel filler opening 20 to a fuel tank (not shown) via the fuel inlet pipe. In order to prevent fuel from dripping from the fuel filler opening 20 onto the side panel 60 during fuel supply, the fuel filler opening 20 is sloped upward.

The bottom wall 15 also has a lid bracket 16 fastened close to the front side 11. The lid bracket 16 has a hinge portion 17 standing from the bottom wall 15 to the outside in the vehicle width direction, and the hinge portion 17 holds a pin 18 on its upper end in a rotatable manner.

The fuel lid 30 is a lid member for covering the recess 10 and is hinged to the bottom wall 15 of the recess 10 via the lid bracket 16. For example, an end portion of the lid bracket 16 close to the front side wall 11 of the recess 10 is rotatably coupled to the fuel lid 30 via the pin 18. This enables the fuel lid 30 to be operated to a closed state where it covers the recess 10 and an open state where the recess 10 is exposed. There is also provided biasing means (not shown), such as a spring, around the pin 18, and it always urges the fuel lid 30 from the closed state to the open state (that is, in the opening direction).

On the inner surface of the fuel lid 30 facing the fuel filler opening 20, a pawl 31 is provided to protrude therefrom (to the fuel filler opening 20 side). The pawl 31 has a rising portion 31A that rises approximately vertically from the inner surface of the fuel lid 30 and a bent portion 31B that extends from an end of the ruing portion 31A approximately parallel to the inner surface of the fuel lid 30. The rising portion 31A has an opening 32 in the center portion thereof, which is formed by press-forming, for example. Further, a portion of the rising portion 31A is folded to form a stopper 33 inside the opening 32 (inner side in the vehicle width direction in FIG. 1).

The distance between the opening 32 and the stopper 33 may be smaller than, for example, the distance between a retracted side surface 54 of the protector 50 and a tip 41 of the locking pin 40 in the extended state, as described below. Thus, when the fuel lid 30 is closed, the locking pin 40 enters the opening 32, but the tip 41 of the locking pin 40 is compressed (stopped) by the stopper 33, and as a result, the locking pin 40 is maintained in a slightly retracted state.

In addition, when the fuel lid 30 is in the closed state for closing the recess 10, the upper side and the lower side of the bent portion 31B of the pawl 31 may be parallel to an upper surface 51 and a lower surface 52 of the protector 50 described below. Such a structure enables removal of excess play in a gap between the upper surface 51 and the lower surface 52 of the protector 50, thereby preventing a splash guard 72 of a fuel supply gun 70 from contacting the locking pin 40 correspondingly.

The locking pin 40 is provided to protrude from the rear side wall 12 of the recess 10 to the inside of the recess 10. The locking pin 40 can advance and retreat in the linear direction such that its tip 41 moves away from and toward the rear side wall 12. The locking pin 40 is urged by biasing means (not shown), such as a spring, such that its tip 41 is separated away from the rear side wall 12. If the fuel lid 30 is in the open state, and if there is no obstacle in the advance and retreat path of the locking pin 40, the separation distance between the tip 41 of the locking pin 40 and the rear side wall 12 becomes maximum. Hereinafter, this state will be referred to as an "extended state."

When the fuel lid 30 is returned from the opened position to the closed position, the pawl 31 temporarily compresses, against the biasing member, the tip 41 of the locking pin 40 to the rear side wall 12 side of the recess 10. Further, when the locking pin 40 matches the opening 32 of the pawl 31, the locking pin 40 enters the opening 32 to be engaged therewith. At this time, the tip 41 of the locking pin 40 comes into contact with the stopper 33 provided inside the opening 32 and is maintained in a slightly compressed state (retracted state).

To shift the fuel lid 30 in the closed state to the open state, for example, a lever (called an opener) provided near the drivers at is operated. Thus, a wire (not shown) connected to a base portion of the locking pin 40 (an end on the opposite side to the tip 41) is drawn, and the locking pin 40 is retracted so as to be separated away from the stopper 33 of the pawl 31. As a result, the tip 41 of the locking pin 40 is off from the opening 32 of the pawl 31. Here, the fuel lid 30 has been originally urged in the opening direction, and therefore, it is moved in the opening direction accordingly.

The base portion of the locking pin 40 is connected to a switching mechanism 42, and the switching mechanism 42 outputs a signal according to the advance/retreat position of the locking pin 40. For example, when the locking pin 40 is in the extended state described above, the switching mechanism 42 outputs an opening signal indicating that the fuel lid 30 is in the open state. In addition, when the locking pin 40 is in the retracted state where it is compressed to the rear side wall 12 side, such as when the tip 41 of the locking pin 40 is compressed by the stopper 33 of the fuel lid 30, the switching mechanism 42 outputs a closing signal indicating that the fuel lid 30 is in the closed state.

These opening signal and closing signal are transmitted to an electronic control unit (ECU) that controls the entire vehicle. Upon receipt of the opening signal, the ECU performs internal combustion engine starting inhibition control for inhibiting starting of internal combustion engine. The ECU also controls a blocking valve (not shown) provided on the fuel inlet pipe to an open state.

On the other hand, upon receipt of the closing signal from the switching mechanism 42, the ECU releases internal combustion engine starting inhibition control and allows the internal combustion engine to start. The ECU also controls the blocking valve on the fuel inlet pipe to a closed state. Closing the blocking valve prevents release of fuel vapor into the air from the fuel tank via the fuel filler opening 20.

The protector 50 is provided around the locking pin 40 and prevents the splash guard 72 of the fuel supply gun 70 from contacting the locking pin 40. The protector 50 is made of a resin material, for example.

Here, it is also possible, for example, to press form the rear side wall 12 of the recess 10 such that it surrounds the locking pin 40; that is, it has a shape similar to that of the protector 50. However, in that case, it is necessary to change a metal mold of the entire side panel 60 (for example, a rear quarter panel) including the recess 10, and this may lead to production cost increase. In this respect, in the present embodiment, by providing the protector 50 as an additional part, it becomes possible to use a conventional metal mold and prevent the splash guard 72 from contacting the locking pin 40.

Further, by using the protector 50, it becomes possible to use the side panel 60 for different models of vehicles. For example, the side panel 60 is used for both a vehicle model in which the blocking valve is not provided on the fuel inlet pipe; that is, a vehicle model in which the fuel inlet pipe is not closed even when the locking pin 40 is in the retracted state during fuel supply, and a vehicle model in which the blocking valve is provided; that is, a vehicle model in which the fuel inlet pipe is closed when the locking pin 40 is in the retracted state. Further, by installing the protector 50 in the latter model, the splash guard 72 is prevented from contacting the locking pin 40; that is, retraction of the locking pin 40 is prevented.

The protector 50 is fixed to the rear side wall 12 and the bottom wall 15 of the recess 10 by bolting or clipping, for example. The protector 50 is formed around the locking pin 40 so as to project from the rear side wall 12 of the recess 10 to the inside of the recess 10.

That is, the protector 50 has the upper surface 51 and the lower surface 52 that are separated with respect to the locking pin 40 in the up-and-down direction and face each other. The protector 50 further has a projecting side surface 53A connected to an end of the upper surface 51 close to the inside of the recess 10, and projects from above the locking pin 40 to the inside of the recess 10. The protector 50 also has a projecting side surface 53B connected to an end of the lower surface 52 close to the inside of the recess 10, and projects from below the locking pin 40 to the inside of the recess 10. Further, the protector 50 has the retracted side surface 54 that connects an end of the upper surface 51 close to the rear side wall 12 with an end of the lower surface 52 close to the rear side wall 12. The retracted side surface 54 is retracted on the rear side wall 12 side further than the locking pin 40.

Referring to FIG. 2, the projection lengths L1 and L2 of the projecting side surfaces 53A and 53B from the rear side wall 12 are set so as to exceed the maximum protrusion length L3 at which the locking pin 40 protrudes to the inside of the recess 10 to the maximum extent; that is, the length of the locking pin 40 from the rear side wall 12 when it is in the extended state.

Further, in order to prevent the splash guard 72 of the fuel supply gun 70 (see FIG. 1) from contacting the protector 50 during fuel supply and prevent the nozzle pipe 71 from being unable to be inserted into the fuel filler opening 20, the protector 50 may be formed such that the length L5 (see FIG. 2) from the center of the fuel filler opening 20 to the projecting side surfaces 53A and 53B exceeds the radius R1 of the splash guard 72 (see FIG. 1).

Meanwhile, the projection length L4 of the retracted surface 54 from the rear side wall 12 is formed so as to be less than the minimum retraction length at which the locking pin 40 is retracted close to the rear side surface 12 to the maximum extent.

The separation distance L6 between the upper surface 51 and the lower surface 52 of the protector 50 is determined according to the shape of the pawl 31 of the fuel lid 30 which is to be engaged with the locking pin 40. For example, the separation distance L6 between the upper surface 51 and the lower surface 52 is formed to exceed the up-and-down direction width L7 (see FIG. 1) of the pawl 31 (L6>L7). In addition, the separation distance between the upper surface 51 of the protector 50 and the locking pin 40 and the separation distance between the lower surface 52 and the locking pin 40 are both determined to be a half value of the separation distance L6 between the upper surface 51 and the lower surface 52.

By adopting the size described above, it becomes possible for the pawl 31 to enter a gap between the upper surface 51 and the lower surface 52 of the protector 50, and the protector does not interfere with engagement between the pawl 31 and the locking pin 40.

In addition, the protector 50 according to the present embodiment has such a shape that the lower surface 52 is sloped downward from the rear side wall 12, on which the locking pin 40 is provided, toward the inside of the recess 10. For example, as illustrated in FIG. 2, the lower surface 52 is sloped downward by an angle θ with respect to the horizontal axis. The upper surface 51 of the protector 50 may also be, a sloped surface similar to (parallel to the lower surface 52. θ may be 10° or greater and 30° or less.

Even if a liquid pool is formed on the lower surface 52 under the locking pin 40, the sloped structure of the lower surface 52 of the protector 50 allows the liquid to flow along the slope of the lower surface 52 and discharges it to the outside the protector 50. Thus, by inhibiting formation of a liquid pool around the locking pin 40, it is possible to prevent the liquid from attaching and freezing between the pawl 31 and locking pin 40 when they are engaged, and prevent the fuel lid 30 from becoming unable to be opened.

Other Embodiments

Although, in the embodiment illustrated in FIG. 1 and FIG. 2, the fuel lid 30 is provided on the front side wall 11 of the recess 10, and the locking pin 40 and the protector 50 are provided on the rear side wall 12, they may be arranged reversely. That is, the fuel lid 30 may be provided on the rear side wall 12 of the recess 10, and the locking pin 40 and the protector 50 may be provided on the front side wall 11. Also in this case, by allowing the lower surface 52 of the protector 50 to have the shape sloped downward from the front side wall 11 toward the inside of the recess 10, accumulation of liquid around the locking pin 40 is inhibited.

The present disclosure is not limited to the embodiments described above, but is intended to include all changes and modifications that are within the technical scope and spirit of the present disclosure as defined in the claims.

The invention claimed is:
1. A vehicle fuel supply part structure comprising:
a fuel filler opening provided in a recess that is formed in a side panel of a vehicle and is recessed to the inside in the vehicle width direction;
a fuel lid capable of being operated to a closed state in which the fuel lid covers the recess and an open state, the fuel lid being hinged to the recess and having a pawl formed to protrude from an inner surface of the fuel lid, the inner surface being a surface that faces the fuel filler opening; and
a locking pin that protrudes from a side wall of the recess to the inside of the recess, the side wall facing forward or rearward in a vehicle longitudinal direction, the locking pin being capable of advancing and retreating such that a tip of the locking pin moves away from and toward the side wall, the locking pin being capable of being engaged with the pawl, during engagement, the tip being in a retracted state in which the tip is compressed to the side wall side, wherein
a protector is provided around the locking pin,
the protector comprises
an upper surface and a lower surface that are separated with respect to the locking pin in the up-and-down direction along the vertical direction, and that face each other, and
side surfaces that are connected to the upper surface and the lower surface and are provided above and below the locking pin in the vertical direction, the side surfaces projecting from the side walls to the inside of the recess to the extent greater than the maximum protrusion length of the locking pin at which the locking pin protrudes to the inside of the recess to the maximum extent,
a gap in which the locking pin is inserted is formed between the upper surface and the lower surface, and
the lower surface is sloped downward to the inside of the recess from the side wall on which the locking pin is provided.

* * * * *